United States Patent
Yang et al.

(10) Patent No.: US 12,530,624 B2
(45) Date of Patent: Jan. 20, 2026

(54) PROVISIONING RESOURCE-EFFICIENT ARTIFICIAL INTELLIGENCE MODELS

(71) Applicant: Accenture Global Solutions Limited, Dublin (IE)

(72) Inventors: Yao Yang, Sunnyvale, CA (US); David Nguyen, Newark, CA (US)

(73) Assignee: ACCENTURE GLOBAL SOLUTIONS LIMITED, Dublin (IE)

( * ) Notice: Subject to any disclaimer, the term of this patent is extended or adjusted under 35 U.S.C. 154(b) by 554 days.

(21) Appl. No.: 18/168,723

(22) Filed: Feb. 14, 2023

(65) Prior Publication Data

US 2024/0273399 A1    Aug. 15, 2024

(51) Int. Cl.
*G06N 20/00*    (2019.01)

(52) U.S. Cl.
CPC .................... *G06N 20/00* (2019.01)

(58) Field of Classification Search
CPC ......... G06N 20/00; G06N 3/082; G06N 3/126
See application file for complete search history.

(56) References Cited

U.S. PATENT DOCUMENTS

| | | | | |
|---|---|---|---|---|
| 11,392,829 | B1 * | 7/2022 | Pool | G06N 3/08 |
| 12,346,818 | B2 * | 7/2025 | Zhang | G06N 3/084 |
| 2025/0037028 | A1 * | 1/2025 | Tuli | G06N 3/045 |
| 2025/0139501 | A1 * | 5/2025 | Tosi | G06N 5/01 |

OTHER PUBLICATIONS

GitHub.com [online], "neuralmagic/sparsify," available on or before Oct. 21, 2021 via Internet Archive: Wayback Machine URL<https://web.archive.org/web/20211021000327/https://github.com/neuralmagic/sparsify>, retrieved on Nov. 1, 2022, retrieved from URL<https://github.com/neuralmagic/sparsify>, 12 pages.

GreenCarCongress.com [online], "Study projects global carbon footprint from ICT will be equivalent to half of transportation's current level by 2040," Mar. 6, 2018, retrieved on Aug. 9, 2023, retrieved from URL<https://www.greencarcongress.com/2018/03/20180306-mcmaster.html>, 12 pages.

Hoefler, "Sparsity in Deep Learning: Pruning and growth for efficient inference and training in neural networks," Journal of Machine Learning Research, Sep. 2021, 22:241, 124 pages.

(Continued)

*Primary Examiner* — Tyler J Torgrimson
(74) *Attorney, Agent, or Firm* — Mannava & Kang, P.C

(57) ABSTRACT

Implementations for receiving first user input representative of a first accuracy-to-resource value for an AI model, determining a first training recipe for training of the AI model, the first training recipe including a first set of reduction strategies to be performed during training of the AI model, the first training recipe being determined through genetic search of an initial population to provide an updated population, the first set of reduction strategies being selected from the updated population, providing the first training recipe for training of the AI model to provide a first trained version of the AI model at least partially by executing one or more of pruning and quantization during training of the AI model, and outputting the first trained version of the AI model for inference.

20 Claims, 5 Drawing Sheets

(56) References Cited

OTHER PUBLICATIONS

Htor.Inf.Ethz.ch [online], "Sparsity in Deep Learning," available on or before May 17, 2022 via Internet Archive: Wayback Machine URL<https://web.archive.org/web/20220517181413/https://htor.inf.ethz.ch/sparsity-in-dl/>, retrieved on Aug. 9, 2023, retrieved from URL<https://htor.inf.ethz.ch/sparsity-in-dl/>, 3 pages.

Jiang et al., "Model Pruning Enables Efficient Federated Learning on Edge Devices," CoRR, submitted on Apr. 6, 2022, arXiv:1909.12326v5, 22 pages.

NeuralMagic.com [online], "SparseML," available on or before Dec. 9, 2022 via Internet Archive: Wayback Machine URL<https://web.archive.org/web/20221209155102/https://docs.neuralmagic.com/products/sparseml/>, retrieved on Aug. 9, 2023, retrieved from URL<https://docs.neuralmagic.com/products/sparseml>, 7 pages.

NeuralMagic.com [online], "Sparsify," upon information and belief, available no later than Oct. 31, 2022, retrieved on Aug. 9, 2023, retrieved from URL<https://docs.neuralmagic.com/archive/sparsify/>, 12 pages.

PYPI.org [online], "Project Description: Sparsify," available on or before Mar. 7, 2021 via Internet Archive: Wayback Machine URL<https://web.archive.org/web/20210307162826/https://pypi.org/project/sparsify/>, retrieved on Aug. 9, 2023, retrieved from URL<https://pypi.org/project/sparsify/>, 12 pages.

TowardsDataScience.com [online], "Introduction to Genetic Algorithms—Including Example Code," Jul. 7, 2017, retrieved on Aug. 9, 2023, retrieved from URL<https://towardsdatascience.com/introduction-to-genetic-algorithms-including-example-code-e396e98d8bf3>, 12 pages.

Wang et al., "Towards ultra-high performance and energy efficiency of deep learning systems: an algorithm-hardware co-optimization framework," Presented at Proceedings of AAAI'18: AAAI Conference on Artificial Intelligence, New Orleans, LA, USA, Feb. 2-7, 2018, 4235-4243.

\* cited by examiner

PROVISIONING RESOURCE-EFFICIENT ARTIFICIAL INTELLIGENCE MODELS

BACKGROUND

Deep learning (DL) has been described as a category of artificial intelligence (AI) that enables applications to execute tasks traditionally performed by humans. AI models have become ubiquitous and are used in numerous applications across various industries (e.g., manufacturing, healthcare, automotive, financial). At a high level, provisioning of an AI model includes a training phase and an inference phase. During the training phase, the AI model is trained on a task (e.g., object detection in images, document matching, autonomous driving, playing chess) using training data that is representative of historical execution of the task. During the inference phase, the (trained) AI model performs the task.

However, the use of AI models implicates consumption of computing resources, such as processors (central processing units (CPUs), graphics processing units (GPUs)) and memory (random access memory (RAM)), which requires electrical energy. Enterprises increasingly seek to leverage AI in their operations in pursuit of efficiency, growth, and profit. However, this increasing use of AI comes with financial cost (i.e., paying the electric bills) and negative impact on sustainability (e.g., increased carbon footprint). While less accurate DL models can balance this, many uses of AI models require a relatively high level of accuracy.

SUMMARY

Implementations of the present disclosure are generally directed to reducing energy and resource consumption in artificial intelligence (AI) (e.g., deep learning (DL)). More particularly, implementations of the present disclosure are directed to an AI training system that provides a training recipe to selectively reduce energy and resource consumption during training of AI models and that provides resource-efficient AI models. In some examples, the training recipe is determined based on user input indicating an accuracy-to-resource value for each AI model that is to be trained.

In some implementations, actions include receiving first user input representative of a first accuracy-to-resource value for an AI model, determining a first training recipe for training of the AI model, the first training recipe including a first set of reduction strategies to be performed during training of the AI model, the first training recipe being determined through genetic search of an initial population to provide an updated population, the first set of reduction strategies being selected from the updated population, providing the first training recipe for training of the AI model to provide a first trained version of the AI model at least partially by executing one or more of pruning and quantization during training of the AI model, and outputting the first trained version of the AI model for inference. Other implementations of this aspect include corresponding systems, apparatus, and computer programs, configured to perform the actions of the methods, encoded on computer storage devices.

These and other implementations can each optionally include one or more of the following features: genetic search includes determining a fitness score for each set of reduction strategies in a plurality of reduction strategies, selecting two sets of reduction strategies from the plurality of reduction strategies based on fitness scores, generating offspring using the two sets of reduction strategies, and forming the updated population as comprising the two sets of reduction strategies and the offspring; genetic search further includes applying one or more mutations to each offspring; the first set of reduction strategies is selected from the updated population as having a highest fitness score among other sets of reduction strategies in the updated population; pruning includes one or more of structured pruning and unstructured pruning; genetic search is executed until a stop condition is reached; and actions further include receiving second user input representative of a second accuracy-to-resource value for the AI model, determining a second training recipe for training of the AI model, the second training recipe including a second set of reduction strategies to be performed during training of the AI model, the second set of reduction strategies being different from the first set of reduction strategies, and providing the second training recipe for training of the AI model to provide a second trained version of the AI model, the second trained version of the AI model having being a different size from the first trained version of the AI model.

The present disclosure also provides a computer-readable storage medium coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure can include any combination of the aspects and features described herein. That is, for example, apparatus and methods in accordance with the present disclosure are not limited to the combinations of aspects and features specifically described herein, but also may include any combination of the aspects and features provided.

The details of one or more implementations of the present disclosure are set forth in the accompanying drawings and the description below. Other features and advantages of the present disclosure will be apparent from the description, drawings, and claims.

BRIEF DESCRIPTION OF DRAWINGS

Like reference numbers and designations in the various drawings indicate like elements.

DETAILED DESCRIPTION

Figure 1:
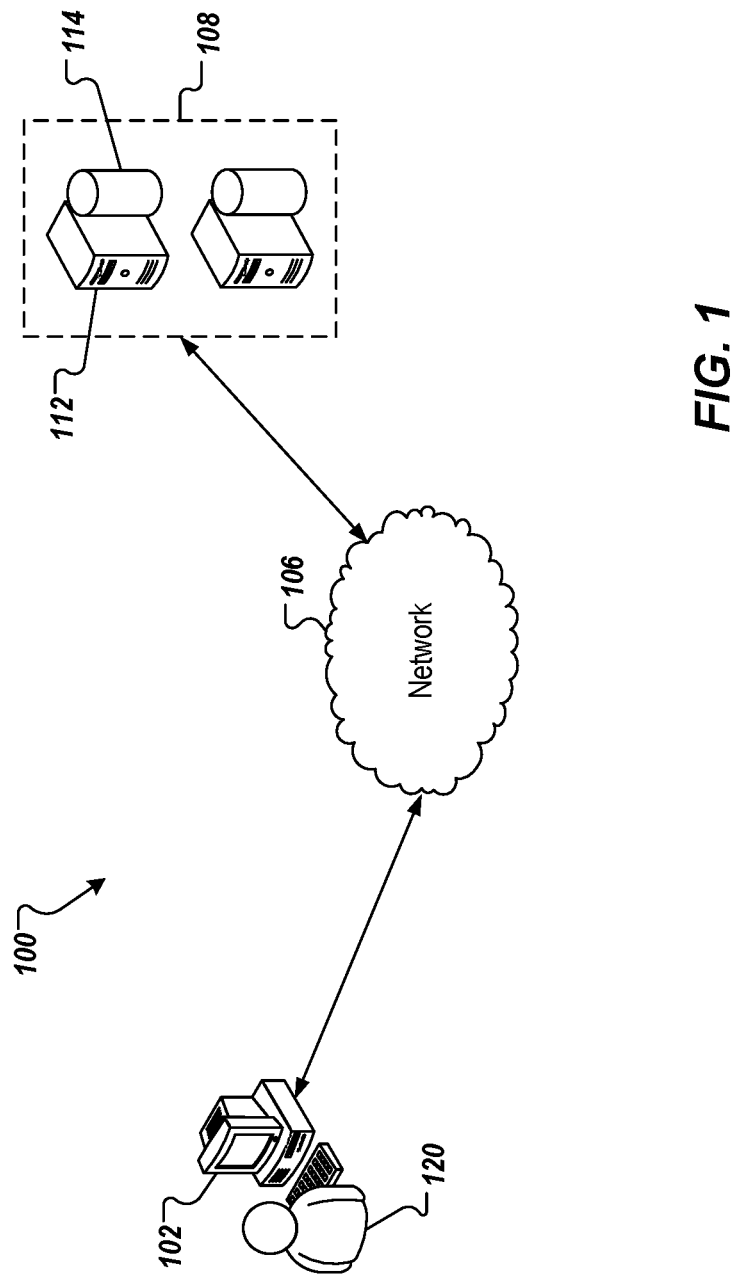
FIG. 1 depicts an example system that can execute implementations of the present disclosure.

Implementations of the present disclosure are generally directed to reducing energy and resource consumption in artificial intelligence (AI) (e.g., deep learning (DL). More particularly, implementations of the present disclosure are directed to an AI training system that provides a training recipe to selectively reduce energy and resource consumption during training of AI models and that provides resource-efficient AI models. In some examples, the training recipe is determined based on user input indicating an accuracy-to-resource value for each ML model that is to be trained.

In some implementations, actions include receiving first user input representative of a first accuracy-to-resource value for an AI model, determining a first training recipe for training of the AI model, the first training recipe including a first set of reduction strategies to be performed during training of the AI model, the first training recipe being determined through genetic search of an initial population to provide an updated population, the first set of reduction strategies being selected from the updated population, providing the first training recipe for training of the AI model to provide a first trained version of the AI model at least partially by executing one or more of pruning and quantization during training of the AI model, and outputting the first trained version of the AI model for inference.

To provide further context, and as introduced above, AI models have become ubiquitous and are used in numerous applications across various industries (e.g., manufacturing, healthcare, automotive, financial). At a high level, provisioning of a AI model includes a training phase and an inference phase. During the training phase, the AI model is trained on a task (e.g., object detection in images, document matching, autonomous driving, playing chess) using training data that is representative of historical execution of the task. During the inference phase, the (trained) AI model performs the task.

However, provisioning and use of AI models implicates consumption of computing resources, such as processors (central processing units (CPUs), graphics processing units (GPUs)) and memory (random access memory (RAM)), which requires electrical energy. The consumption of electrical energy for AI models can be measured in kilowatt-hours (kWh), for example, but can also be discussed in terms of carbon footprint, which can be provided in, for example, pounds of carbon dioxide (lbs-$CO_2$). Energy is consumed during both the training phase and the inference phase.

The amount of energy consumed for an AI model can depend on the complexity and size of the AI model, as well as the accuracy required for the AI model. For example, for complex tasks (e.g., healthcare, autonomous driving, playing chess), AI models can be relatively large including hundreds of millions of parameters and billions of operations (e.g., floating-point operations) can be executed (e.g., during training and/or inference). For critical tasks (e.g., cancer detection, autonomous driving), accuracy of the AI model is important. In general, accuracy of an AI model can be a function of the complexity of the AI model and the amount of training data that the AI model is trained on. The complexity of an AI model impacts the number of parameters and operations executed, and thus, energy expended by the AI model. The amount of training data impacts the duration of training of the AI model, and thus, energy expended during training. The energy expended on inference is correlated with the size and complexity of the model as well. Further, the size and complexity of the model affects the energy expended during inference. A larger, more complex model will consume more energy during inference than a smaller, less complex model.

To highlight the impact AI models can have, illustrative examples are provided. For example, a known chess AI model for playing chess and a known language AI model for producing human-like text can be considered. The chess AI model includes upwards of 46 million parameters and uses upwards of 2000 CPUs and 280 GPUs per game, consuming enough energy to fully charge 300-400 electric vehicles, for example. The language AI model includes upwards of 175 billion parameters and requires 355 GPU years (i.e., 355 years using a single GPU) to train at a cost of approximately $4.6 million.

Enterprises increasingly seek to leverage AI in their operations in pursuit of efficiency, growth, and profit. However, this increasing use of AI comes with financial cost (i.e., paying the electric bills) and negative impact on sustainability (i.e., increased carbon footprint). While less accurate AI models can balance this, many uses of AI models require a relatively high level of accuracy.

In view of the foregoing, and as introduced above, implementations of the present disclosure are directed to an AI training system that provides a training recipe to selectively reduce energy and resource consumption during training of AI models and that provides resource-efficient AI models for inference. As described in further detail herein, the training recipe is determined based on user input indicating an accuracy-to-resource value for each AI model that is to be trained. More particularly, genetic algorithm is executed to evaluate and select the optimal evolving sets of reduction strategies based on the accuracy-to-resource value provided for a respective AI model. A set of reduction strategies is selected as the training recipe and each reduction strategy in the set of reduction strategies is performed during training of the AI model. In some implementations, the AI training system of the present disclosure can be provided as a cloud-based system. In some examples, the AI training system of the present disclosure can be integrated with one or more existing cloud-based ML services (e.g., Azure ML) as an ML energy trimming tool, for example.

FIG. 1 depicts an example system 100 that can execute implementations of the present disclosure. The example system 100 includes a computing device 102, a back-end system 108, and a network 106. In some examples, the network 106 includes a local area network (LAN), wide area network (WAN), the Internet, or a combination thereof, and connects web sites, devices (e.g., the computing device 102), and back-end systems (e.g., the back-end system 108). In some examples, the network 106 can be accessed over a wired and/or a wireless communications link.

In some examples, the computing device 102 can include any appropriate type of computing device such as a desktop computer, a laptop computer, a handheld computer, a tablet computer, a personal digital assistant (PDA), a cellular telephone, a network appliance, a camera, a smart phone, an enhanced general packet radio service (EGPRS) mobile phone, a media player, a navigation device, an email device, a game console, or an appropriate combination of any two or more of these devices or other data processing devices.

In the depicted example, the back-end system 108 includes at least one server system 112, and data store 114. In some examples, the at least one server system 112 hosts one or more computer-implemented services that users can interact with using computing devices. For example, the server system 112 can host an AI training system for training AI models in accordance with implementations of the present disclosure. In some examples, a user 120 provides input to a AI training system hosted by the server system 112, the input indicating an accuracy-to-resource value for a AI model that is to be trained. As described in further detail herein, the AI training system determines a training recipe that can be used to reduce resource consumption during training of the AI model and provide a more compact version of the AI model for reduced resource consumption during inference.

Figure 2:
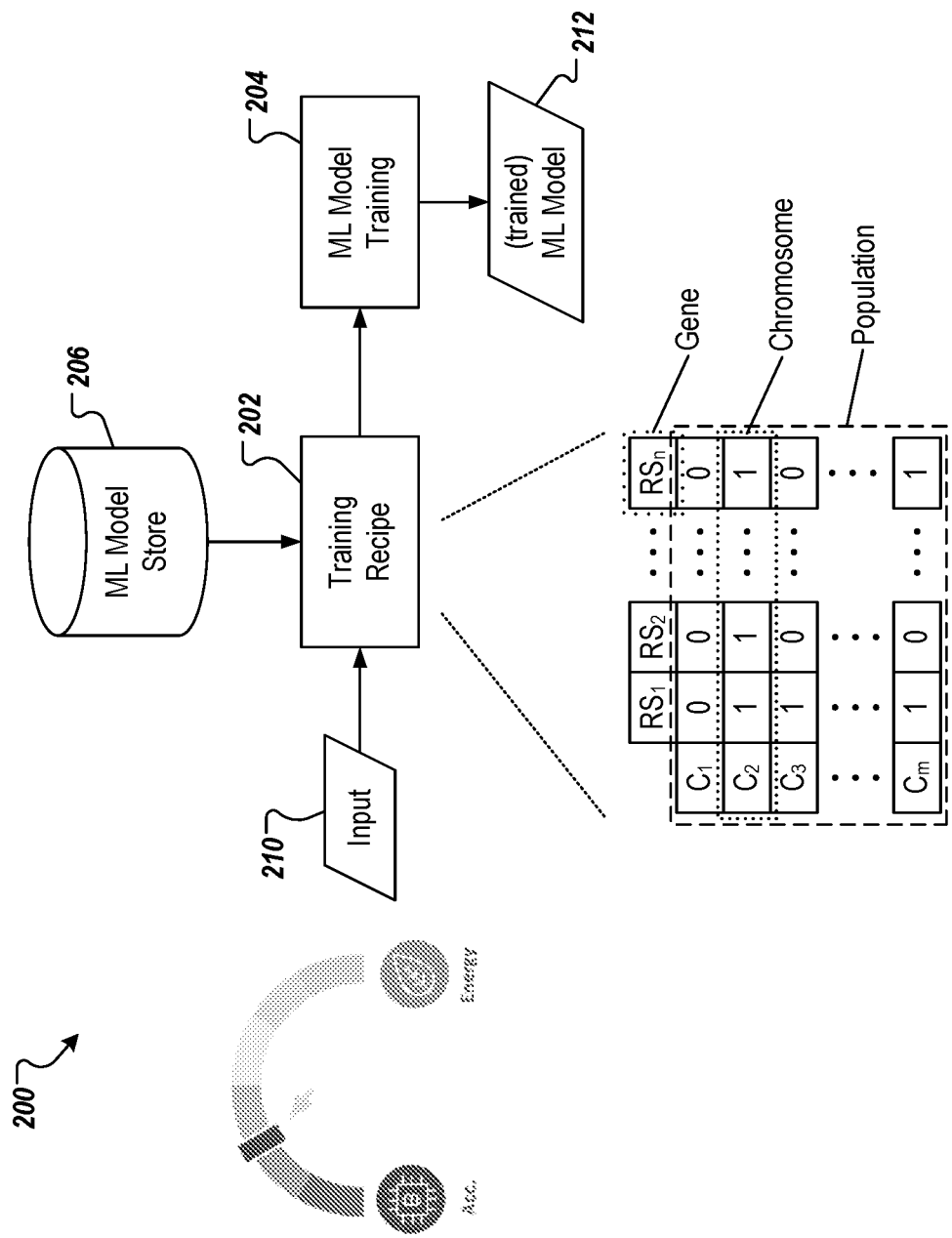
FIG. 2 depicts an AI training system in accordance with implementations of the present disclosure.

FIG. 2 depicts an AI training system 200 in accordance with implementations of the present disclosure. In the example of FIG. 2, the AI training system 200 includes a training recipe module 202, a AI training module 204, and a AI model store 206. As described in further detail herein, the AI training system 200 receives user input 210 and provides a AI model 212 responsive to the user input 210. More particularly, the AI training module 204 receives an untrained AI model and executes training in accordance with implementations of the present disclosure to provide the AI model 212.

In general, the AI model is iteratively trained over multiple epochs, where, during an epoch, one or more parameters of the AI model are adjusted, and an output is generated based on the training data. For each epoch, a loss function is determined based to represent a degree of accuracy of the output of the AI model for the respective epoch. The loss function can be described as a representation of a degree of difference between the output of the AI model and an expected output of the AI model (the expected output being provided from training data). In some examples, if the loss function does not meet an expected value (e.g., is not equal to zero), parameters of the AI model are adjusted in another epoch of training. In some instances, this process is repeated until the loss value meets the expected value. In some instances, this process is repeated for a predefined number of epochs. In general, the training process is executed to minimize the loss function.

In accordance with implementations of the present disclosure, the AI training module 204 trains the AI model using a set of reduction strategies. In some examples, the set of reduction strategies includes zero or more reduction strategies. That is, for example, the set of reduction strategies can be empty or can include one or more reduction strategies. In general, a reduction strategy can be described as a strategy implemented during training of a AI model that, through implementation, results in reduced consumption of resources during training and/or a more compact and/or efficient (trained) AI model than had the reduction strategy not been implemented during training. Example reduction strategies are described in further detail herein by way of non-limiting example. It is contemplated, however, that implementations of the present disclosure can be realized using any appropriate type of reduction strategy. Example types of reduction strategies include pruning and quantization.

In general, pruning can be described as increasing a sparsity of an AI model by removing weight connections and/or parameters of the AI model. In some examples, sparsity can refer to absence of parameters (e.g., nodes) of the AI model and/or weight connections between parameters. Examples pruning algorithms can include, without limitation, variational dropout, regularization (e.g., L0, Hoyer), weight reintroduction (e.g., RigL), and gradual magnitude pruning (GMP), etc. It is contemplated, however, that any appropriate pruning algorithm can be used. In some examples, pruning can include unstructured pruning and structured pruning. Unstructured pruning can be described as removing one or more weight connections between parameters (e.g., nodes) from the AI model by, for example, setting the weight connections equal to zero. Structured pruning can be described as removing one or more parameters (e.g., nodes) from the AI model by, for example, setting any weight connections to/from the parameters equal to zero.

In general, quantization can be described as reducing precision of weights, biases, and/or activations within an AI model. For example, using quantization, an AI model can be converted from using 32-bit floats to represent parameters to using 8-bit integers. An example quantization algorithm includes, without limitation, BinaryConnect. It is contemplated, however, that any appropriate quantization algorithm can be used.

In some implementations, and referring again to FIG. 2, a set of reduction strategies is determined based on the user input 210. In some examples, the user input 210 includes an accuracy-to-resource value. For example, a user (e.g., the user 120 of FIG. 1) can provide the user input 210 through a user interface (UI) displayed by a computing device (e.g., the computing device 102 of FIG. 1). In some examples, the accuracy-to-resource value represents a relative importance of accuracy of the AI model to resources consumed through training of and inference using the AI model. That is, the accuracy-to-resource value indicates a target accuracy to resource-efficiency balance. For example, and without limitation, the accuracy-to-resource value can be along a range of [0, 1], where 0 indicates that accuracy is wholly important and resource-efficiency is wholly unimportant, and 1 indicates that accuracy is wholly unimportant, and resource-efficiency is wholly important. As another example, 0.5 indicates that accuracy and resource-efficiency are equally important.

In some implementations, the user input 210 indicates an AI model that is to be trained. For example, the user input 210 can include a model identifier that uniquely identifies the AI model that is to be trained. In some examples, the training recipe module 202 retrieves the AI model 206 from the AI model store 202 based on the user input 210. In some examples, the AI model as retrieved from the AI model store 206 is untrained. That is, for example, the AI model is absent parameter values determined through training.

In accordance with implementations of the present disclosure, the training recipe module 202 determines a training recipe for the AI model as a set of reduction strategies that are to be applied during training of the AI model. In some implementations, the training recipe module 202 provides the set of reduction strategies based on the user input 210. For example, if the user input 210 includes an accuracy-to-resource value of 0, the training recipe module 202 can determine that no reduction strategies are to be used during training. Consequently, the set of reduction strategies is empty.

In some implementations, the training recipe module 202 determines the set of reduction strategies using genetic search, which can be described as a search for optimal outcome heuristic that represents a process of natural selection, through which the most-effective set of reduction strategies is determined responsive to the accuracy-to-resource value. In some examples, a super-set of reductions strategies can include [$RS_1, \ldots, RS_n$], which can include, for example, one or more pruning algorithms and one or more quantization algorithms. Here, and in terms of genetic search, each reduction strategy ($RS_i$) can be considered a gene and a set of reduction strategies can be considered a chromosome, where a group of sets of reductions strategies can be considered a population. In the example of FIG. 2, the population includes a set of chromosomes [$C_1, \ldots, C_m$], each chromosome indicating a binary value (0, 1) for a respective reduction strategy ($RS_i$), where, for example, 0 indicates that the respective reduction strategy is absent from the chromosome (i.e., set of reduction strategies represented by the chromosome), and 1 indicates that the respective reduction strategy is included in the chromosome (i.e., set of reduction strategies represented by the chromosome).

In some implementations, not all reduction strategies can be used for all types of AI models. For example, an example reduction strategy can be considered that can be used for a first type of AI model, but cannot be used for a second type of AI model. In some examples, the super-set of reduction strategies $[RS_1, \ldots, RS_n]$ can include only those reduction strategies that can be used for the type of the AI model that is to be trained. In some examples, the super-set of reduction strategies can be determined from a library of reduction strategies based on type of the AI model, and those reduction strategies in the library of reduction strategies that can be used for the type of the AI model are included in the super-set of reduction strategies.

In some implementations, the genetic search includes multiple phases. Example phases include, without limitation, initial population, fitness function, selection, crossover, and mutation. In some examples, the initial population phase includes providing an initial group of possible sets of reduction strategies (e.g., an initial population of chromosomes). The initial population can be provided based on a finite number of reduction strategies and, for a given task, can be fixed.

For purposes of non-limiting illustration, an example initial population can be based on a super-set of reductions strategies $[RS_1, \ldots, RS_4]$ and can be provided as:

TABLE 1

| Example Initial Population | | | | |
|---|---|---|---|---|
| $C_1$: | 0 | 0 | 0 | 0 |
| $C_2$: | 1 | 1 | 1 | 1 |
| $C_3$: | 1 | 0 | 1 | 0 |
| $C_4$: | 1 | 0 | 0 | 1 |

In the fitness function phase, a fitness score is determined for each set of reduction strategies in the initial population. The fitness score represents how fit a respective set of reduction strategies is in achieving the accuracy-to-resource balance represented by the accuracy-to-resource value provided by the user. The fitness score can be determined based on a fitness function. For purposes of non-limiting illustration, and example fitness function can be provided as:

$$f = a + 1/e$$

where $f$ is the fitness score, a is an accuracy of the AI model, and e is energy expended. It is contemplated, however, that implementations of the present disclosure can be realized with any appropriate fitness function.

In the selection phase, two parents are selected from the initial population based on fitness scores. For example, the two sets of reduction strategies having the highest fitness scores are selected. In some examples, non-selected sets of reductions strategies are removed from the population. Continuing with the example of Table 1, it can be determined that the set of reduction strategies represented by the chromosome $C_2$ and the set of reduction strategies represented by the chromosome $C_4$ have the highest fitness scores and are, consequently, selected. Further, the set of reduction strategies represented by the chromosome $C_1$ and the set of reduction strategies represented by the chromosome $C_3$ are removed from the population.

In the crossover phase, a crossover point between genes (reduction strategies) is randomly determined. For example:

TABLE 2

| Example Crossover Point | | | | |
|---|---|---|---|---|
| | Crossover → | | | |
| $C_2$: | 1 | 1 | 1 | 1 |
| $C_4$: | 1 | 0 | 0 | 1 |

In the example of Table 2, the crossover point is in the center. Offspring of the sets of reduction strategies are generated. For example, offspring are generated by exchanging genes of the parents from left-to-right until the crossover point is reached. Continuing with the example of Table 2, the following example offspring can be generated:

TABLE 3

| Example Offspring | | | | |
|---|---|---|---|---|
| $C_5$: | 1 | 0 | 1 | 1 |
| $C_6$ | 1 | 1 | 0 | 1 |

In the mutation phase, one or more mutations can be applied to one or more of the offspring. In some examples, a mutation is provided by randomly changing one or more genes. Continuing with the example of Table 3, the following example mutations can be provided:

TABLE 4

| Offspring with Example Mutations | | | | |
|---|---|---|---|---|
| $C_5$: | 0 | 0 | 1 | 1 |
| $C_6$ | 1 | 1 | 0 | 0 |

The (mutated) offspring are added to provide an updated population. Continuing with the above examples, the following updated population can be provided:

TABLE 5

| Example Updated Population | | | | |
|---|---|---|---|---|
| $C_2$: | 1 | 1 | 1 | 1 |
| $C_4$ | 1 | 0 | 0 | 1 |
| $C_5$: | 0 | 0 | 1 | 1 |
| $C_6$: | 1 | 1 | 0 | 0 |

The phases can repeat until a stop condition occurs. In some examples, the stop condition includes a maximum number of iterations (e.g., provided as a preset value). In some examples, the stop condition includes determining that the population has converged (e.g., no offspring are produced that are different from chromosomes of the observed populations).

In some implementations, when the stop condition occurs, a set of reduction strategies is selected. For example, the set of reduction strategies of the current population having the highest fitness score is selected. In some examples, and referring again to FIG. 2, the training recipe module 202 provides the set of reduction strategies to the AI model training module 204 as a training recipe that is to be applied during training of the AI model. For example, the training recipe can be provided as a set of instructions that indicate which reduction strategies are to be performed during training. In some examples, the training recipe module 202 provides the (untrained) AI model to the AI model training module 204. The AI model training module 204 executes training of the AI model using the reduction strategies provided in the training recipe to provide the AI model 212. The AI model 212 can be stored in a model store (e.g., the AI model store 206) and can be provided for use during inference. For example, the AI model 212 can be provided to one or more computer systems that can receive input, process the input through the AI model 212, and receive output from the AI model 212. In some examples, the output includes a prediction (e.g., object detected in an image, next move in a game, matching of documents) that can be used in performance of a task (e.g., autonomous driving, playing chess, reconciling accounts).

Figure 3:
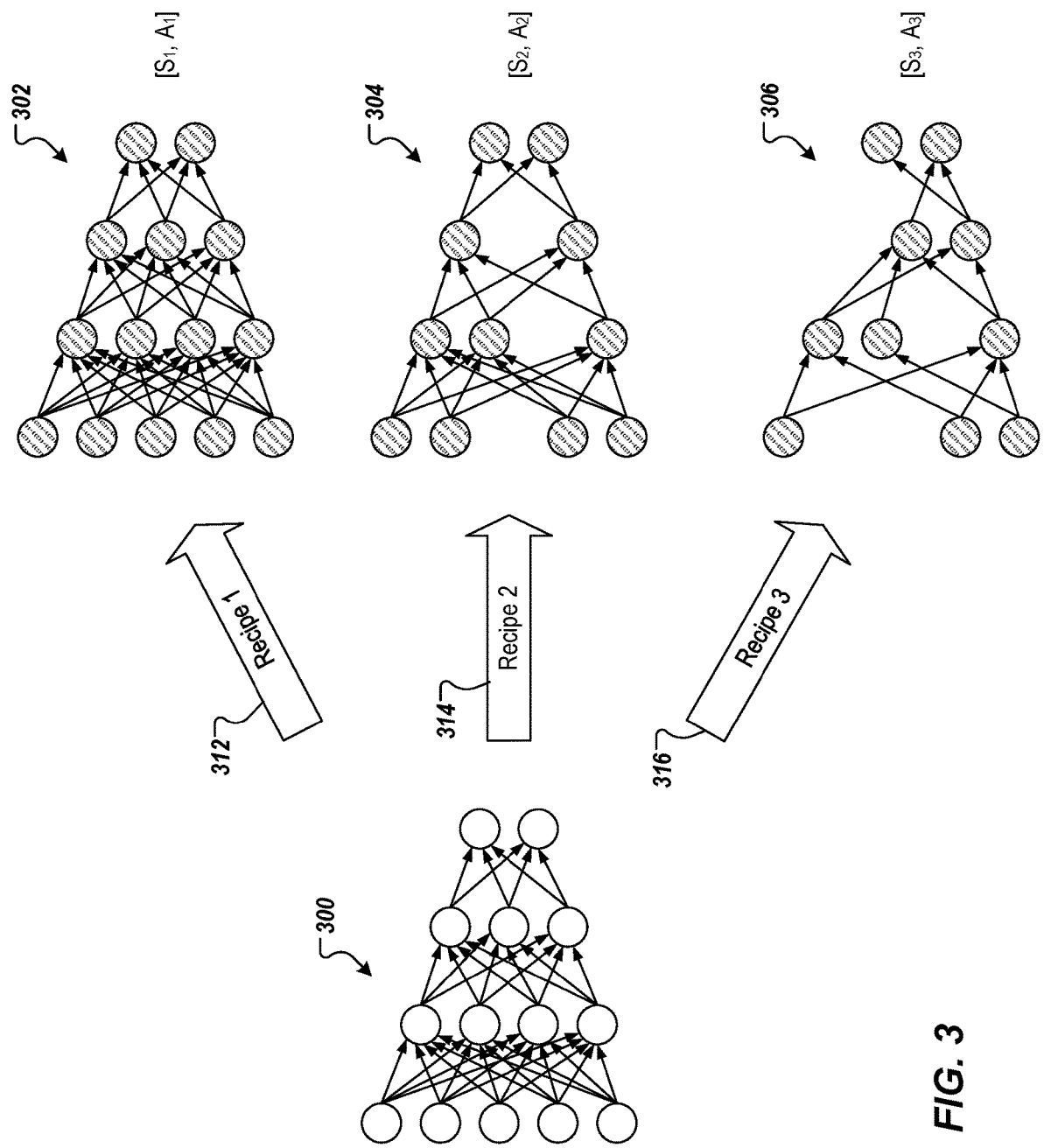
FIG. 3 depicts representations of example AI models trained in accordance with implementations of the present disclosure.

FIG. 3 depicts representations of example AI models trained in accordance with implementations of the present disclosure. FIG. 3 includes AI model representations 300, 302, 304, 306. The AI model representation 300 represents an untrained AI model, which can be absent parameters determined through training or include initialized parameters (nodes) prior to training represented as empty nodes. The AI model representations 302, 304, 306 represent respective AI models that are trained versions of the untrained AI model, represented as parameterized nodes, using respective training recipes 312, 314, 316 in accordance with implementations of the present disclosure. In some examples, the training recipes 312, 314, 316 are each determined using genetic search based on user input indicating respective accuracy-to-resource values, as described herein. For example, the training recipe 312 can be determined based on an accuracy-to-resource value of 0, the training recipe 314 can be determined based on an accuracy-to-resource value of 0.5, and the training recipe 316 can be determined based on an accuracy-to-resource value of 1.

The AI model representation 302 represents a trained version that includes all parameters and all weighted connections of the untrained AI model, each parameter being a parameterized node with values determined through training. For example, the training recipe 312 is absent any model reduction strategies during training (e.g., a first set of reduction strategies that is empty). The AI model representation 304 represents a trained version that includes less than all parameters and all weighted connections for the remaining parameters of the untrained AI model, each parameter being a parameterized node with values determined through training. For example, the training recipe 314 includes a second set of reduction strategies applied during training. The AI model representation 306 represents a trained version that includes less than all parameters and less than all weighted connections for the remaining parameters of the untrained AI model, each parameter being a parameterized node with values determined through training. For example, the training recipe 316 includes third set of reduction strategies applied during training, the third set of reduction strategies being different from the second set of reduction strategies. In the example of FIG. 3, the training recipe 314 includes unstructured pruning and the training recipe 316 includes both unstructured pruning and structured pruning.

In the example of FIG. 3, the AI model represented by the AI model representation 302 is associated with a set of characteristics [$S_1$, $A_1$], the AI model represented by the AI model representation 304 is associated with a set of characteristics [$S_2$, $A_2$], and the AI model represented by the AI model representation 306 is associated with a set of characteristics [$S_3$, $A_3$], where S indicates size of the respective AI model (e.g., in MB) and A indicates accuracy of the AI model, where $S_1 > S_2 > S_3$ and $A_1 > A_2 > A_3$.

Figure 4:
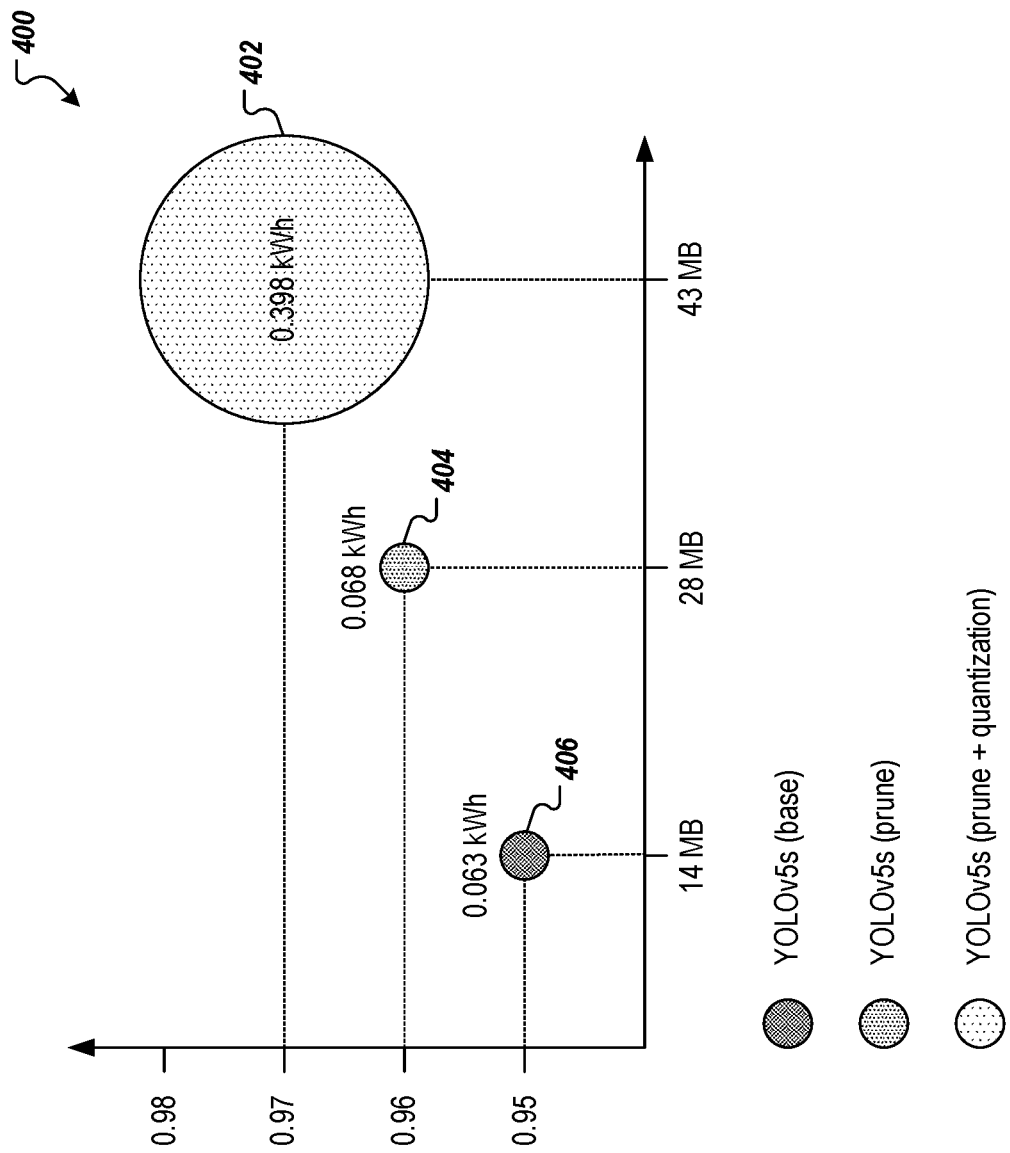
FIG. 4 is a graph depicting example test results for an example AI model trained in accordance with implementations of the present disclosure.

FIG. 4 is a graph 400 depicting example test results for an example AI model trained in accordance with implementations of the present disclosure. The example AI model is provided as the YOLOv5s object detection model, which is published by Ultralytics, Inc. In the example of FIG. 4, the graph 400 includes circle 402, 404, 406 representative of different versions of the example AI model, where a center of each circle 402, 404, 406 is located at a respective size, accuracy coordinate (e.g., [S, A]) and an area of each circle represents energy that would be expended to train the respective version of the example AI model.

The circle 402 represents training of the example AI model without any reduction strategies being applied (e.g., a base version of the example AI model). The circle 402 represents training of the example AI model with a first set of reduction strategies being applied (e.g., an empty set). The circle 404 represents training of the example AI model with a second set of reduction strategies being applied (e.g., a non-empty set). The circle 406 represents training of the example AI model with a third set of reduction strategies being applied (e.g., a non-empty set), the third set of reduction strategies being different from the second set of reduction strategies. As represented in FIG. 4, training without reduction strategies incurs the highest cost in terms of energy consumed. Thus, it can be seen, that implementations of the present disclosure achieve energy efficiencies during training.

As also represented in FIG. 4, implementations of the present disclosure achieve energy efficiencies during inference. For example, smaller AI model sizes reduce the memory footprint required to store the AI model. Also, smaller AI model sizes indicate a lower number of parameters and/or weighted connections, which results in a reduced number of operations executed during inference, thereby providing a more energy-efficient AI model than had reductions strategies not been applied during training.

Figure 5:
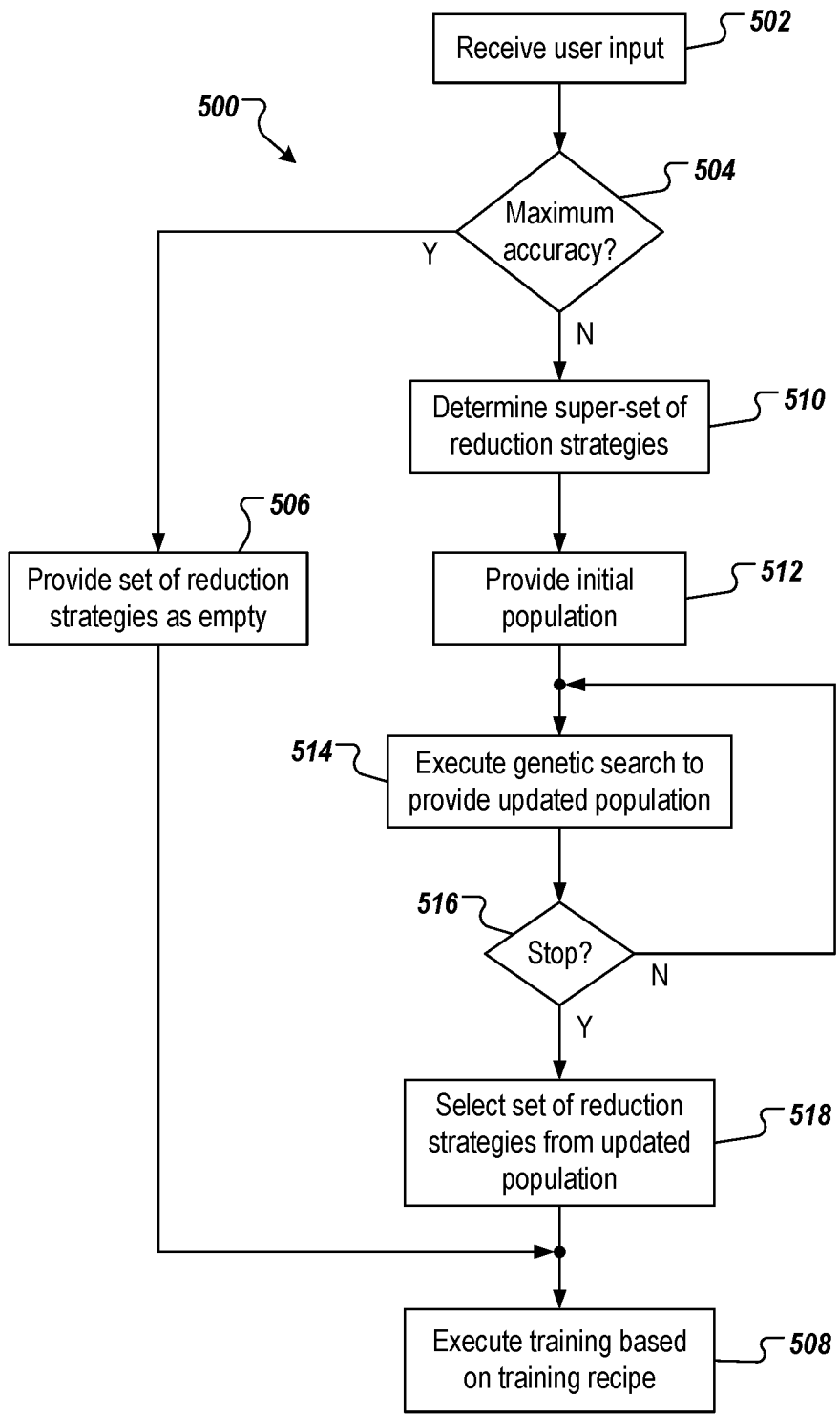
FIG. 5 depicts an example process that can be executed in accordance with implementations of the present disclosure.

FIG. 5 depicts an example process 500 that can be executed in implementations of the present disclosure. In some examples, the example process 500 is provided using one or more computer-executable programs executed by one or more computing devices. The example process 500 of FIG. 5 represents a training recipe to selectively reduce energy and resource consumption during training of AI models and that provides resource-efficient AI models in accordance with implementations of the present disclosure.

User input is received (502). For example, and as described herein with reference to FIG. 2, the user input 210 includes an accuracy-to-resource value, where a user (e.g., the user 120 of FIG. 1) provides the user input 210 through a user UI displayed by a computing device (e.g., the computing device 102 of FIG. 1). In some examples, the accuracy-to-resource value represents a relative importance of accuracy of the AI model to resources consumed through training of and inference using the AI model.

It is determined whether the user input indicates a maximum accuracy (504). For example, and as described herein, the accuracy-to-resource value can be along a range of [0, 1], where 0 indicates that accuracy is wholly important and resource-efficiency is wholly unimportant, and 1 indicates that accuracy is wholly unimportant and resource-efficiency is wholly important. In this example, if the user input indicates an accuracy-to-resource value of 0, it can be determined that the user input indicates a maximum accuracy. If a maximum accuracy is indicated, a training recipe is provided as an empty set of reduction strategies (506) and training is executed based on the training recipe (508). For example, and as described herein, training of the AI model is executed without applying any reduction strategy. If a maximum accuracy is not indicated, a super-set of reduction strategies is determined (510). For example, and as described herein, the super-set of reduction strategies [$RS_1, \ldots, RS_n$] can include only those reduction strategies that can be used for the type of the AI model that is to be trained. In some examples, the super-set of reduction strategies can be determined from a library of reduction strategies based on type of the AI model, and those reduction strategies in the library of reduction strategies that can be used for the type of the AI model are included in the super-set of reduction strategies.

An initial population is provided (512). For example, and as described herein, the initial population can be provided as a group of sets of reduction strategies, each set of reduction strategies representing a chromosome. Genetic search is executed to provide an updated population (514). For example, and as described herein, phases of fitness function, selection, crossover, and mutation can be performed in genetic search to provide the updated population. In some examples, this can include determining a fitness score for each set of reduction strategies in the population, selecting two sets of reduction strategies based on fitness scores, generating offspring using the two sets of reduction strategies, and forming the updated population as including the two sets of reduction strategies and the offspring.

It is determined whether a stop condition has been achieved (516). For example, and as described herein, it can be determined whether a maximum number of iterations of genetic search have been performed. As another example, it can be determined whether the population has converged (e.g., no offspring are produced that are different from chromosomes of the observed populations in previous iterations). If a stop condition has not been achieved, the example process 500 loops back to perform another iteration of genetic search.

If a stop condition has been achieved, a training recipe is provided as a set of reduction strategies selected from the updated population (518). For example, and as described herein, the set of reduction strategies of the current population having the highest fitness score is selected. Training is executed based on the training recipe (508). For example, and as described herein, the training recipe module 202 provides the (selected) set of reduction strategies to the AI model training module 204 as a training recipe that is to be applied during training of the AI model. For example, the training recipe can be provided as a set of instructions that indicate which reduction strategies are to be performed during training. In some examples, the training recipe module 202 provides the (untrained) AI model to the AI model training module 204. The AI model training module 204 executes training of the AI model using the reduction strategies provided in the training recipe to provide the AI model 212. The AI model 212 can be stored in a model store (e.g., the AI model store 206) and can be provided for use during inference. For example, the AI model 212 can be provided to one or more computer systems that can receive input, process the input through the AI model 212, and receive output from the AI model 212. In some examples, the output includes a prediction (e.g., object detected in an image, next move in a game, matching of documents) that can be used in performance of a task (e.g., autonomous driving, playing chess, reconciling accounts).

Implementations of the present disclosure provide one or more technical advantages. For example, by providing a training recipe, implementations of the present disclosure enable an optimal combination of reduction strategies to be determined to achieve a target accuracy to resource-efficiency balance represented by the accuracy-to-resource value. This enables resource-efficiencies in both training and inference, while meeting accuracy requirements. While reductions strategies, such as pruning and quantization, are known, implementations of the present disclosure enable unique combinations of reductions strategies to be determined for training of respective AI models to achieve requested target accuracy to resource-efficiency balances.

Implementations and all of the functional operations described in this specification may be realized in digital electronic circuitry, or in computer software, firmware, or hardware, including the structures disclosed in this specification and their structural equivalents, or in combinations of one or more of them. Implementations may be realized as one or more computer program products (i.e., one or more modules of computer program instructions encoded on a computer readable medium for execution by, or to control the operation of, data processing apparatus). The computer readable medium may be a machine-readable storage device, a machine-readable storage substrate, a memory device, a composition of matter effecting a machine-readable propagated signal, or a combination of one or more of them. The term "computing system" encompasses all apparatus, devices, and machines for processing data, including by way of example a programmable processor, a computer, or multiple processors or computers. The apparatus may include, in addition to hardware, code that creates an execution environment for the computer program in question (e.g., code that constitutes processor firmware, a protocol stack, a database management system, an operating system, or any appropriate combination of one or more thereof). A propagated signal is an artificially generated signal (e.g., a machine-generated electrical, optical, or electromagnetic signal) that is generated to encode information for transmission to suitable receiver apparatus.

A computer program (also known as a program, software, software application, script, or code) may be written in any appropriate form of programming language, including compiled or interpreted languages, and it may be deployed in any appropriate form, including as a stand-alone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry (e.g., an FPGA (field programmable gate array) or an ASIC (application specific integrated circuit)).

Processors suitable for the execution of a computer program include, by way of example, both general and special purpose microprocessors, and any one or more processors of any appropriate kind of digital computer. Generally, a processor will receive instructions and data from a read only memory or a random access memory or both. Elements of a computer can include a processor for performing instructions and one or more memory devices for storing instructions and data. Generally, a computer will also include, or be operatively coupled to receive data from or transfer data to, or both, one or more mass storage devices for storing data (e.g., magnetic, magneto optical disks, or optical disks). However, a computer need not have such devices. Moreover, a computer may be embedded in another device (e.g., a mobile telephone, a personal digital assistant (PDA), a mobile audio player, a Global Positioning System (GPS) receiver). Computer readable media suitable for storing computer program instructions and data include all forms of non-volatile memory, media and memory devices, including by way of example semiconductor memory devices (e.g., EPROM, EEPROM, and flash memory devices); magnetic disks (e.g., internal hard disks or removable disks); magneto optical disks; and CD ROM and DVD-ROM disks. The processor and the memory may be supplemented by, or incorporated in, special purpose logic circuitry.

To provide for interaction with a user, implementations may be realized on a computer having a display device (e.g., a CRT (cathode ray tube), LCD (liquid crystal display) monitor) for displaying information to the user and a keyboard and a pointing device (e.g., a mouse, a trackball, a touch-pad), by which the user may provide input to the computer. Other kinds of devices may be used to provide for interaction with a user as well; for example, feedback provided to the user may be any appropriate form of sensory feedback (e.g., visual feedback, auditory feedback, tactile feedback); and input from the user may be received in any appropriate form, including acoustic, speech, or tactile input.

Implementations may be realized in a computing system that includes a back end component (e.g., as a data server), a middleware component (e.g., an application server), and/or a front end component (e.g., a client computer having a graphical user interface or a Web browser, through which a user may interact with an implementation), or any appropriate combination of one or more such back end, middleware, or front end components. The components of the system may be interconnected by any appropriate form or medium of digital data communication (e.g., a communication network). Examples of communication networks include a local area network ("LAN") and a wide area network ("WAN"), e.g., the Internet.

The computing system may include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the disclosure or of what may be claimed, but rather as descriptions of features specific to particular implementations. Certain features that are described in this specification in the context of separate implementations may also be implemented in combination in a single implementation. Conversely, various features that are described in the context of a single implementation may also be implemented in multiple implementations separately or in any suitable sub-combination. Moreover, although features may be described above as acting in certain combinations and even initially claimed as such, one or more features from a claimed combination may in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products.

A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claims.

What is claimed is:

1. A computer-implemented method for provisioning resource-efficient artificial intelligence (AI) models, the method comprising:
   receiving first user input representative of a first accuracy-to-resource value for an AI model;
   determining a first training recipe for training of the AI model, the first training recipe comprising a first set of reduction strategies to be performed during training of the AI model, the first training recipe being determined through genetic search of an initial population to provide an updated population, the first set of reduction strategies being selected from the updated population;
   providing the first training recipe for training of the AI model to provide a first trained version of the AI model at least partially by executing one or more of pruning and quantization during training of the AI model; and
   outputting the first trained version of the AI model for inference.

2. The method of claim 1, wherein genetic search comprises:
   determining a fitness score for each set of reduction strategies in a plurality of reduction strategies;
   selecting two sets of reduction strategies from the plurality of reduction strategies based on fitness scores;
   generating offspring using the two sets of reduction strategies; and
   forming the updated population as comprising the two sets of reduction strategies and the offspring.

3. The method of claim 2, wherein genetic search further comprises applying one or more mutations to each offspring.

4. The method of claim 1, wherein the first set of reduction strategies is selected from the updated population as having a highest fitness score among other sets of reduction strategies in the updated population.

5. The method of claim 1, wherein pruning comprises one or more of structured pruning and unstructured pruning.

6. The method of claim 1, wherein genetic search is executed until a stop condition is reached.

7. The method of claim 1, further comprising:
   receiving second user input representative of a second accuracy-to-resource value for the AI model;

determining a second training recipe for training of the AI model, the second training recipe comprising a second set of reduction strategies to be performed during training of the AI model, the second set of reduction strategies being different from the first set of reduction strategies; and providing the second training recipe for training of the AI model to provide a second trained version of the AI model, the second trained version of the AI model having being a different size from the first trained version of the AI model.

8. A system, comprising:

one or more processors; and a computer-readable storage device coupled to the one or more processors and having instructions stored thereon which, when executed by the one or more processors, cause the one or more processors to perform operations for provisioning resource-efficient artificial intelligence (AI) models, the operations comprising:

receiving first user input representative of a first accuracy-to-resource value for an AI model;

determining a first training recipe for training of the AI model, the first training recipe comprising a first set of reduction strategies to be performed during training of the AI model, the first training recipe being determined through genetic search of an initial population to provide an updated population, the first set of reduction strategies being selected from the updated population;

providing the first training recipe for training of the AI model to provide a first trained version of the AI model at least partially by executing one or more of pruning and quantization during training of the AI model; and outputting the first trained version of the AI model for inference.

9. The system of claim 8, wherein genetic search comprises:

determining a fitness score for each set of reduction strategies in a plurality of reduction strategies;

selecting two sets of reduction strategies from the plurality of reduction strategies based on fitness scores;

generating offspring using the two sets of reduction strategies; and forming the updated population as comprising the two sets of reduction strategies and the offspring.

10. The system of claim 9, wherein genetic search further comprises applying one or more mutations to each offspring.

11. The system of claim 8, wherein the first set of reduction strategies is selected from the updated population as having a highest fitness score among other sets of reduction strategies in the updated population.

12. The system of claim 8, wherein pruning comprises one or more of structured pruning and unstructured pruning.

13. The system of claim 8, wherein genetic search is executed until a stop condition is reached.

14. The system of claim 8, wherein operations further comprise:

receiving second user input representative of a second accuracy-to-resource value for the AI model;

determining a second training recipe for training of the AI model, the second training recipe comprising a second set of reduction strategies to be performed during training of the AI model, the second set of reduction strategies being different from the first set of reduction strategies; and providing the second training recipe for training of the AI model to provide a second trained version of the AI model, the second trained version of the AI model having being a different size from the first trained version of the AI model.

15. Computer-readable storage media coupled to the one or more processors and having instructions stored thereon which, when executed by the one or more processors, cause the one or more processors to perform operations for provisioning resource-efficient artificial intelligence (AI) models, the operations comprising:

receiving first user input representative of a first accuracy-to-resource value for an AI model;

determining a first training recipe for training of the AI model, the first training recipe comprising a first set of reduction strategies to be performed during training of the AI model, the first training recipe being determined through genetic search of an initial population to provide an updated population, the first set of reduction strategies being selected from the updated population;

providing the first training recipe for training of the AI model to provide a first trained version of the AI model at least partially by executing one or more of pruning and quantization during training of the AI model; and outputting the first trained version of the AI model for inference.

16. The computer-readable storage media of claim 15, wherein genetic search comprises:

determining a fitness score for each set of reduction strategies in a plurality of reduction strategies;

selecting two sets of reduction strategies from the plurality of reduction strategies based on fitness scores;

generating offspring using the two sets of reduction strategies; and forming the updated population as comprising the two sets of reduction strategies and the offspring.

17. The computer-readable storage media of claim 16, wherein genetic search further comprises applying one or more mutations to each offspring.

18. The computer-readable storage media of claim 15, wherein the first set of reduction strategies is selected from the updated population as having a highest fitness score among other sets of reduction strategies in the updated population.

19. The computer-readable storage media of claim 15, wherein pruning comprises one or more of structured pruning and unstructured pruning.

20. The computer-readable storage media of claim 15, wherein genetic search is executed until a stop condition is reached.

* * * * *